Dec. 15, 1953  L. E. ELLISON  2,662,408
ELECTRONIC PRESSURE INDICATOR
Filed Oct. 18, 1947

INVENTOR.
LYNN E. ELLISON
BY
Edward H. Lang
ATTORNEY

Patented Dec. 15, 1953

2,662,408

UNITED STATES PATENT OFFICE 2,662,408

ELECTRONIC PRESSURE INDICATOR

Lynn E. Ellison, Crystal Lake, Ill., assignor to The Pure Oil Company, Chicago, Ill., a corporation of Ohio Application October 18, 1947, Serial No. 780,726

4 Claims. (Cl. 73—398)

This invention relates to an electrical detection and measuring device for the measurement of physical effects, such as static or dynamic pressures in closed systems. A particular application of the device is in the measurement of pressures in internal combustion engines in the evaluation of detonation characteristics of fuels.

Dynamic pressure measuring devices, particularly as embodied in detonation detection and measurement for internal combustion engines, take various forms to measure the frequency and degree of knocking. The quantitative evaluation of the phenomena as related to fuel compositions is a highly developed art, and devices for the purpose, in general, utilize indicating meters, lamps, or other types of voltage indicators which give some sort of visual or audible signal corresponding to the detonation phenomenon under observation. The solution to the problem of detecting the detonation has revolved about the direct translation or amplification of the detonation itself to the detected signal. In general, the major disadvantage of conventional devices has lain in the fact that they were too specifically designed for the very narrow purpose in view.

Accordingly, it is an object of this invention to provide an improved dynamic pressure indicator versatile enough to be useful as an engine detonation indicator, but which will also have general applicability for the measurement of physical effects by converting them into changes in electrical quantities.

It is a second object of the invention to provide an improved pressure indicating arrangement which will utilize a small and simple apparatus.

A further object of the invention is to provide a detonation detecting system which can be calibrated to a given level so that a change above the predetermined level will give a corresponding response in the detecting system.

Other objects and advantages of the invention will in part be obvious and in part appear hereinafter.

The invention thus broadly comprehends an arrangement of electrical elements which comprises a probing means responsive to a physical effect, such as a detonation or pressure change, which will translate said effect to a change of an electrical quantity and in turn transmit this signal to an oscillator circuit to alter the frequency thereof, which oscillations in turn are relayed to a resonant circuit to develop an exaggerated signal therefrom to be transmitted to the detecting apparatus.

To understand more fully the nature, scope and operation of the invention, reference should be had to the following drawings in which.

Figures 1, 2, 3:
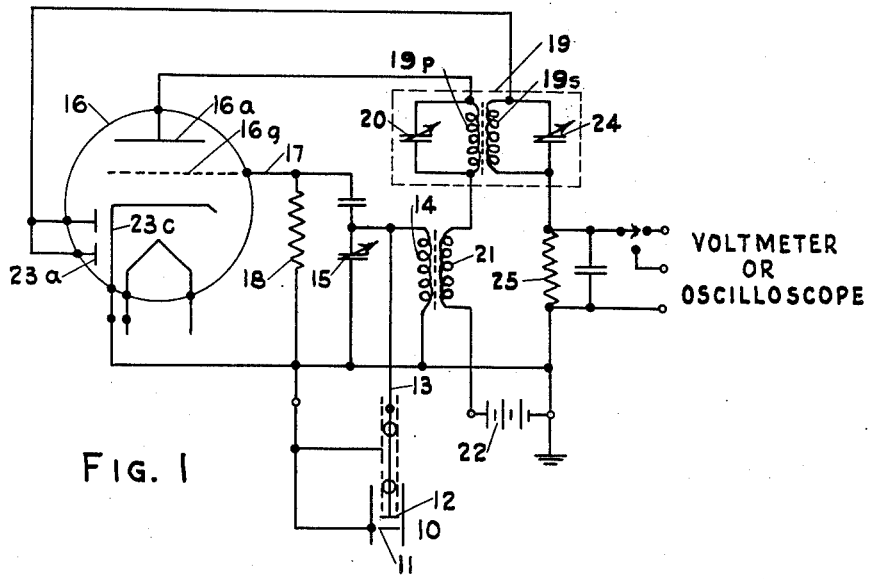
Figure 1 is a circuit diagram showing a preferred embodiment of the invention.
Figure 2 is a representation of a generalized frequency response curve showing points to which the apparatus should be tuned when being used as a simple pressure gauge and as a compound pressure gauge.
Figure 3 represents an alternative circuit arrangement for the combination.

Referring now to Figure 1 for the details of a circuit comprising an operative device, 10 represents a pickup unit which is shown as a capacitor having plates 11 and 12. Plate 11 acts as a diaphragm responsive to pressure changes. From the pickup unit, shielded lead 13 makes connection with coil 14 of an oscillator transformer and variable capacitor 15. Effectively, capacitors 15 and 10 are in parallel and lumped together in the oscillator circuit comprising capacitor 15, coil 14 and tube 16.

Lead 17 provides input connection to the tube 16 by way of grid 16g. Resistor 18 is the grid return resistor for the circuit. Output from plate 16a is conducted to tuned transformer 19 having primary coil 19p and secondary coil 19s. Capacitor 20 is connected in parallel with primary 19p. Return is made via the primary coil 21 of the oscillator transformer to the high voltage side of power supply 22.

A rectifier circuit comprising diode plate 23a and cathode 23c, in the same envelope as elements 16a and 16g of tube 16, includes in its diode circuit the secondary coil 19s of tuned transformer 19, which secondary has capacitor 24 in parallel therewith. Coils 19p and 19s and capacitors 20 and 24, which make up the tuned transformer 19, have been enclosed with a dotted line to indicate that the parts are commonly obtainable as a unit. Return to ground from the secondary 19s is made through resistor 25. Connection can be made across resistor 25 with either a vacuum tube voltmeter or oscilloscope for the measurement of the voltage developed.

The operation of the device calls for tuning the transformer 19 for maximum output at a given frequency by applying a signal of that frequency to grid 16g and adjusting capacitors 20 and 24. A convenient value to use is the standard superheterodyne frequency, 456 kilocycles per second. Capacitor 15 is then adjusted to set the oscillator frequency at a level slightly higher than that for which the transformer 19 is tuned, so that the output of the tuned transformer 19 at the oscillator frequency is close to its minimum.

When a pressure is applied to the plate 11, the space between the plates is decreased and the capacity of the unit thereby increased. As a result of this increase in capacity, the frequency of oscillations in the circuit is reduced. The signal then passing through the primary of transformer 19 approaches the resonant frequency thereof, with the result that there is developed a sharp increase in the voltage output across secondary 19s. The output voltage of the transformer is rectified by diode 23 and indicated by a vacuum tube voltmeter or cathode ray oscilloscope across resistor 25 where it appears as a half-wave rectified direct current signal.

By tuning the frequency of the resonant transformer to the proper point on its response curve, advantage may be taken of its linearity during the sharp change in the slope thereof, with the result that changes in the pressure in the system being studied will be reflected as substantially linear changes in the voltage detected across the resistor.

In Figure 2 there is shown a generalized frequency response curve for a tuned circuit such as the transformer 19. By tuning the oscillator to a frequency corresponding to about point "A" on the curve, it will be seen that a relatively small decrease in frequency, f, of the oscillator will produce a very sharp increase E in the voltage across the circuit.

As indicated, the diagram shown in Figure 1 consists merely of a preferred embodiment of the apparatus which can be altered to suit the particular phenomenon being studied. For example, reference to Figure 1 will show that adjustment in the design of the capacitive pickup will convert it to one which will show a decrease in capacity to correspond to a reduction in pressure, thereby reversing the direction of the several signals obtained in the system corresponding to a pressure change.

The adjustment for converting the pressure indicator into a compound gauge is made by moving the oscillator frequency to a point corresponding to that marked "B" on the curve comprising Figure 2. At this point, the voltage appearing across resistor 25 will be the reference or zero voltage. When conditions in the closed system result in a pressure lower than that called for by the reference voltage, the capacitance of the pickup unit will be reduced, thereby causing the signal passing through the resonant transformer 19 to change frequency in the direction of point "A." The output voltage of the transformer which will be detected across resistor 25 will show a change in a characteristic direction, thus giving an alteration in voltage output which is proportional to the reduction of pressure in the system.

When the pressure increases to a level above that indicated by the reference voltage, the capacity of the pickup is increased causing a sharp increase in voltage to appear across resistor 25 in the manner described in connection with the principal embodiment of the invention.

Because inductive tuning also can be employed in modulating the frequency of the oscillator network the capacitive pickup, which is employed as the frequency modulator in the circuit diagram shown in Figure 1, can be replaced by an inductive one in which the permeability of a coil can be varied by having a metal tuner vary its position in the coil with changes in the effect to be measured in substantially the manner in which the capacity is caused to fluctuate. Such an embodiment is illustrated partially in Figure 3 where 30 represents the pickup unit comprising core 31 and coil 32. The remaining elements of the pickup unit and input circuit are substantially the same as those of Figure 1 and are identified with corresponding numerals. In such a case, the direction in changes of the oscillation will correspond to those changes produced by the capacitive tuner.

Although only a single embodiment of the invention has been illustrated and described in detail, it is clear from the description of Figure 3 that changes and modifications in the apparatus which reflect changes in the variable to be used as the detecting variable can be made without departing from the invention, which resides in the combination of elements responsive to the external effect to produce corresponding characteristic electrical changes. Thus, it is clear that the embodiment shown in Figure 1 is readily used to measure any physical property of a material which can be related to its dielectric constant, because the material can be used as the dielectric in the detecting condenser.

What is claimed is:

1. A pressure indicating apparatus which consists essentially of an oscillator network, a detecting and indicating network, a tuned transformer having a primary coil and a secondary coil inductively coupling said networks, and a detecting device sensitive to variations in pressure consisting of a pressure actuated frequency modulator, said oscillator network consisting essentially of a thermionic vacuum tube having at least a cathode grid and plate elements, a plate circuit, a grid control circuit, and an oscillator transformer having a primary coil and a secondary coil, the plate circuit electrically connecting said plate and said cathode elements and having serially disposed therein the primary coil of said tuned transformer, the primary coil of said oscillator transformer, and a source of power supply, respectively; said plate circuit being inductively coupled to said grid control circuit through the secondary coil of said oscillator transformer, said grid control circuit consisting essentially of a variable capacitance, the secondary coil of said oscillator transformer, and said frequency modulator interconnected in parallel, said grid control circuit being directly electrically connected between said grid and said cathode, said oscillator network being tuned to a frequency slightly in variance from the resonant frequency of said tuned transformer, means connected to the secondary coil output of said tuned transformer to rectify the voltage output therefrom, and means included in said detecting and indicating network for translating and making manifest the electrical characteristics of said detecting and indicating network into quantitative indications of pressure variations actuating said detecting device.

2. An apparatus in accordance with claim 1 in which the frequency modulating device is capacitively operated.

3. An apparatus in accordance with claim 1 in which the frequency modulating detecting device is inductively operated.

4. An apparatus useful for measuring detonation in an internal combustion engine which consists essentially of an oscillator network, a detecting and indicating network, a tuned transformer having a primary coil and a secondary coil inductively coupling said networks, and a detecting device sensitive to variations in pressure consisting of a pressure actuated frequency modulator, said oscillator network consisting essentially of a triode-duodiode tube, the triode elements of said tube consisting of a plate, grid, and cathode being operatively connected in said oscillator network, a plate circuit, a grid control circuit, and an oscillator transformer having a primary coil and a secondary coil, the plate circuit electrically connecting said plate and said cathode and having serially disposed therein the primary coil of said tuned transformer, the primary coil of said oscillator transformer, and a source of power supply, respectively, said plate circuit being inductively coupled to said grid control circuit through the secondary coil of said oscillator transformer, said grid control circuit consisting essentially of a variable capacitance, the secondary coil of said oscillator transformer, and said frequency modulator interconnected in parallel, said grid control circuit being electrically connected between said grid and said cathode, said oscillator network being tuned to a frequency slightly in variance from the resonant frequency of said tuned transformer, means consisting of the duodiode section of said tube connected in series to the secondary coil of said tuned transformer to rectify the voltage output therefrom, and means included in said detecting and indicating network for translating and making manifest the electrical characteristics of said detecting and indicating network into quantitative indications of pressure variations actuating said detecting device.

LYNN E. ELLISON.

References Cited in the file of this patent

UNITED STATES PATENTS

| Number | Name | Date |
|---|---|---|
| 2,117,894 | Lenehan | May 17, 1938 |
| 2,177,528 | Kidd | Oct. 24, 1939 |
| 2,297,346 | Crist | Sept. 29, 1942 |
| 2,361,634 | Koch | Oct. 31, 1944 |
| 2,371,040 | Fisher et al. | Mar. 6, 1945 |
| 2,371,373 | Badmaieff | Mar. 13, 1945 |
| 2,439,047 | Grinstead et al. | Apr. 6, 1948 |

OTHER REFERENCES

Article in Society of Automotive Engineers Journal Transaction, vol. 52, No. 11, June 1944, by Grinstead, et al., pages 534–546. Book "Mechanical Measurements by Electrical Methods"—Roberts; published by Instrument Publishing Co., Pittsburgh, Pa. 1946 (pages 14–15).